(12) United States Patent
Gavela et al.

(10) Patent No.: US 7,636,025 B2
(45) Date of Patent: Dec. 22, 2009

(54) LOW-RISE DUPLEXER

(75) Inventors: Isabel Gavela, München (DE); Alenko Lic, Deutschlandsberg (AT); Bernhard Reichel, Deutschlandsberg (AT)

(73) Assignee: EPCOS AG, Munich (DE)

( * ) Notice: Subject to any disclaimer, the term of this patent is extended or adjusted under 35 U.S.C. 154(b) by 165 days.

(21) Appl. No.: 10/584,374

(22) PCT Filed: Nov. 30, 2004

(86) PCT No.: PCT/EP2004/013590

§ 371 (c)(1),
(2), (4) Date: Apr. 30, 2007

(87) PCT Pub. No.: WO2005/067093

PCT Pub. Date: Jul. 21, 2005

(65) Prior Publication Data

US 2007/0194862 A1 Aug. 23, 2007

(30) Foreign Application Priority Data

Jan. 8, 2004 (DE) .................. 10 2004 001 347

(51) Int. Cl.
*H01P 1/213* (2006.01)
*H01P 1/205* (2006.01)

(52) U.S. Cl. .................. 333/134; 333/202; 333/206

(58) Field of Classification Search ............... 333/133, 333/134, 189, 193, 195, 202, 204, 205, 207, 333/222, 223

See application file for complete search history.

(56) References Cited

U.S. PATENT DOCUMENTS

| 5,045,824 | A | 9/1991 | Metroka |
| 5,177,458 | A | 1/1993 | Newell et al. |
| 5,572,175 | A | 11/1996 | Tada et al. |
| 5,686,873 | A | 11/1997 | Tada et al. |
| 6,014,067 | A | 1/2000 | Matsumoto et al. |
| 6,278,343 | B1 | 8/2001 | Okada et al. |

(Continued)

FOREIGN PATENT DOCUMENTS

DE 199 50 353 5/2000

(Continued)

OTHER PUBLICATIONS

English translation for Written Opinion for PCT/EP2004/013590.

*Primary Examiner*—Benny Lee
*Assistant Examiner*—Kimberly E Glenn
(74) *Attorney, Agent, or Firm*—Fish & Richardson P.C.

(57) ABSTRACT

A duplexer that includes an input filter (Rx filter), an output filter (Tx filter), and one or more of an isolation line and a delay line is disclosed. The Rx and Tx filters are microwave (MW) resonators and include continuous, internally metallized holes in a ceramic body. The ceramic body includes a metal coating substantially covering the external surfaces of the ceramic body except for an end face and one or more recesses on a bottom side of the ceramic body. An output of the Rx filter on the bottom side of the ceramic body is electrically connected to a balun. The ceramic body has a first height in an area of the Tx filter and a second height in an area of the Rx filter, the second height being less than the first height.

14 Claims, 3 Drawing Sheets

U.S. PATENT DOCUMENTS

| | | | |
|---|---|---|---|
| 6,420,942 | B1 | 7/2002 | Hiroshima et al. |
| 6,525,626 | B2 * | 2/2003 | Mandai et al. ............... 333/134 |
| 6,801,101 | B2 * | 10/2004 | Hiroshima et al. .......... 333/134 |
| 2003/0214367 | A1 | 11/2003 | Uriu et al. |

FOREIGN PATENT DOCUMENTS

| | | |
|---|---|---|
| EP | 0 552 761 | 7/1993 |
| JP | 62-235801 | 10/1987 |
| JP | 2003-209413 | 7/2003 |

* cited by examiner

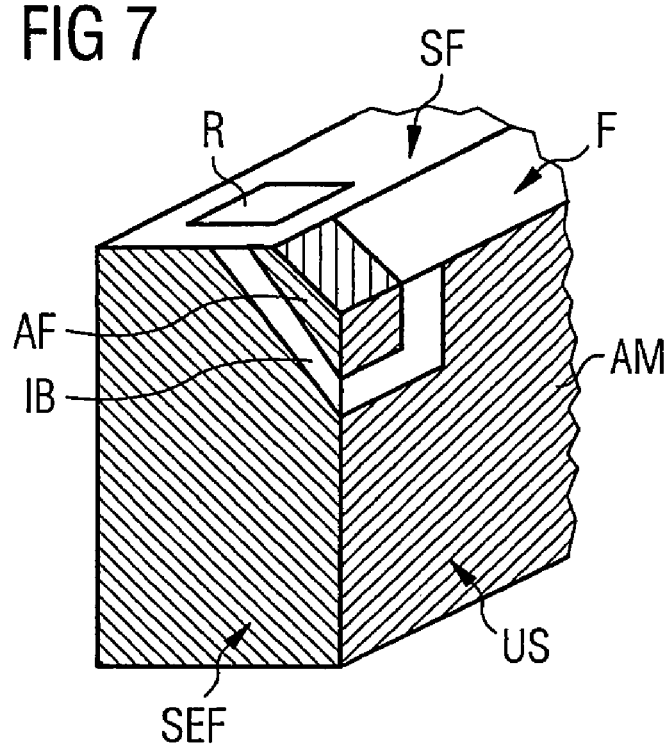
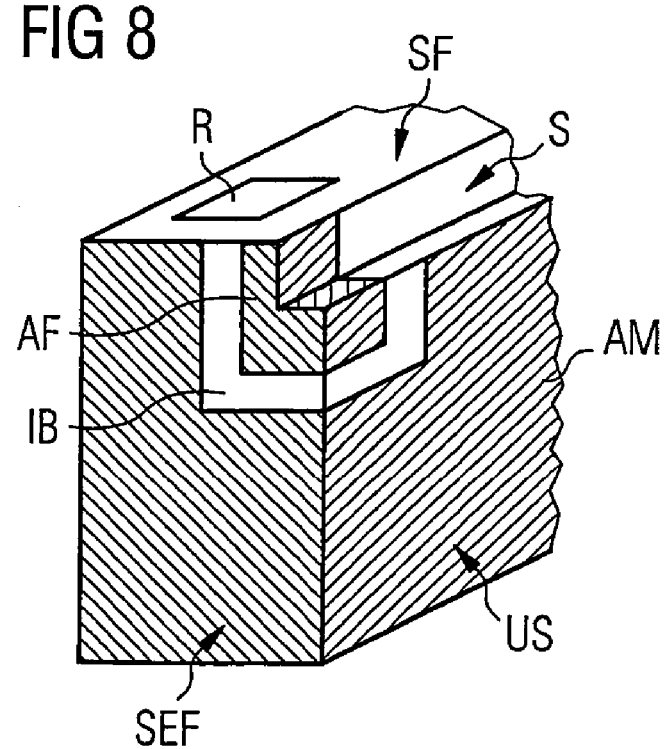

LOW-RISE DUPLEXER

TECHNICAL FIELD

A duplexer is a dividing network for separating the reception and transmission signals of a certain frequency band of a data transmission system, where data transmission takes place in both directions over a shared antenna. A duplexer usually has a bandpass filter in each signal path, e.g., a filter that operates with acoustic waves or consists of a plurality of dielectric resonators incorporated electrically and mechanically. A duplexer ensures that there is no mutual influence on the paths and, for example, a transmission signal (TX signal) is not input into the reception path (RX path).

BACKGROUND

A known microwave ceramic filter consists of at least one resonator designed in a dielectric ceramic base body. The base body therefore has at least one hole, the inside walls of which are metallized. The outside walls of the ceramic base body are also metallized except for one end face and are contacted with the metallic hole on the short-circuit end, which is opposite the non-metallized end face. Electric terminal faces which are used for direct or indirect capacitive coupling to the metallized hole, forming the actual resonator, are provided on the bottom side or on one end face, where they are electrically isolated from the exterior metallization.

Microwave ceramic filters have the advantage that they can be designed comparatively easily and manufactured inexpensively.

Furthermore, they have a low insertion loss.

U.S. Pat. No. 5,686,873 discloses a monolithic duplexer. A single ceramic body is provided, containing a transmission branch (TX path) and a reception branch (RX path), each composed of a plurality of coupled resonators. The advantage of such monolithic duplexer lies in its manufacture: only one ceramic body need be pressed in one piece, which greatly simplifies fabrication in comparison with the manufacture of two ceramic bodies.

In known microwave ceramic duplexers, the individual signal paths of the RX path and the TX path are unbalanced so that each input and output is designed to be single-ended. However, there are already demands on the part of chip manufacturers and telephone manufacturers to design the RX path for future UMTS systems to be balanced already starting with the duplexer. Such a symmetrical output requires two terminals at which two signals having opposite polarity, i.e., ideally with a 180° phase shift can be picked up. Such balanced outputs are to be sent in particular to simple modern amplifiers for the RX system.

A balanced output signal cannot be supplied by a microwave ceramic duplexer without increasing the size of the component and providing additional holes. This usually requires an external balun, while other filter techniques such as SAW filters and duplexers may contain the balun functionality integrated into the filter design.

Microwave ceramic duplexers have an extremely low insertion loss in contrast with the former, with a larger design in comparison with SAW filters, and they have a good electric and acoustic adjustment. The low insertion loss is especially interesting for UMTS systems with regard to the possible lengthening of the operating time of the battery. The combination of a microwave ceramic (MWC) duplexer with a separate balun on a circuit board results either in a greater base area being required or the allowed overall height of the component being exceeded; at the present time, the overall height is based on MWC duplexers without a balun. However, a corresponding reduction in the height of the duplexer results in a considerable sacrifice in terms of performance and in particular an increase in the insertion loss in both branches.

SUMMARY

A duplexer having a balun functionality which can be designed with the same base area in comparison with a duplexer without a balun and with a lower overall height is disclosed.

In some embodiments, a duplexer includes, an RX filter (input filter), a TX filter (output filter) and a line connected between the two filters, optionally an isolation line and/or a delay line or both. Both filters are designed in a shared ceramic body as microwave resonators in the form of continuous internally metallized holes. With some exceptions, e.g., an end face and recesses for the contacts on the bottom side, the ceramic body has a largely closed exterior metallization which is in electric contact with the metallized holes on the short-circuit end opposite the end face.

In the area of the RX filter, the ceramic body has a lower overall height than in the area of the TX filter and is fixedly connected there to a balun, so that preferably the total overall height of the RX filter plus balun is approximately equal to the overall height of the TX filter. This yields a duplexer in the form of a single component having a balun functionality. The duplexer has a compact design which is preferably not increased in its outer dimensions in comparison with a known monolithic duplexer without a balun. The RX output of the duplexer is connected to the balun which in turn has two RX outputs for providing a symmetrical signal.

In some embodiments, the duplexer benefits from the advantageously low insertion loss of microwave ceramic filters which have a substantial safety margin from the specification limit even without a balun and with the original overall height. It is therefore possible to reduce the overall height of the RX filter, in which case the negative effect on insertion loss associated with this is still enough to fulfill the required specifications of the communication system. Since only the RX filter has a reduced overall height, the TX filter remains unchanged and has good insertion loss without any change.

The balun is implemented in an LTCC (low-temperature co-fired ceramic) and can therefore have an extremely small overall height of approximately 0.3 to 0.4 mm. For example, only five dielectric ceramic layers are sufficient to achieve this. Such a known balun(e.g., a Marchand balun having a coplanar design) can also be implemented with a base area smaller than the area required for the RX filter. Such a balun may be used with a duplexer having a reduced overall height of 1.3 to 2.5 mm. In the area of the RX filter, the height of the ceramic body is then reduced by 0.3 to 0.4 mm, the amount required for the balun, to 0.9 to 2.2 mm.

The balun is preferably arranged in a recess on the bottom side of the duplexer in the area of the RX filter. The depth of the recess corresponds approximately to the height of the balun, yielding a compact duplexer having a cubical design and a uniform overall height. The balun is fixedly connected to the ceramic body, so the duplexer can be handled as a one-piece component.

However, it is also possible to use a balun having an even smaller base area and to arrange the recess on the bottom side of the RX filter advantageously near the end face, which is not metallized. On the short-circuit end, where the resonator holes are connected to the exterior metallization, the RX filter has the original overall height. This embodiment has the advantage that it is associated with a lower loss of quality and the electric properties of the RX path remain unchanged.

The arrangement of the balun on the bottom side of the ceramic body has the advantage that it can easily be connected there to the terminal faces of the RX filter, in particular to the RX output, which is also at the bottom. The outputs of the balun are then also available on the bottom side of the duplexer. It is possible here to install the two terminal faces for the symmetrical output of the balun at a desired location without requiring intervention into the filter structure.

The connection between the balun and the ceramic body may be established by soldering or adhesive bonding. In both cases, the electric connection is established between the terminal faces of the RX filter and the balun at the same time. This requires electric and mechanical connections to the terminal faces for the RX output, depending on the design of the balun and the duplexer, to the exterior metallization; in the case of adhesive bonding, these connections are to be established with the help of an electrically conductive adhesive. Both fastening techniques allow an adequately tight bond between the ceramic body and the balun, thus permitting reliable handling of the entire duplexer.

Each of the two, i.e., the RX filter and TX filter, have at least two resonator holes which have in particular a cross-sectional area and/or shape that varies over the length of the hole and/or one is offset in relation to the other. The cross section may be, for example, round on the short-circuit end but rectangular on the other end near the end face.

Metallic structures that are designed as coupling structures and are preferably arranged on the bottom side of the ceramic body form a capacitance to one or more resonator holes. This means that metallic surfaces or structures that are used as coupling structures are arranged near a resonator hole but are designed to be at a definite distance from and with electric isolation from the resonator hole.

The at least two coupling resonators span the pass band of the filter. An influence on the pass band flanks can be achieved by additional coupling holes if they are aligned in such a way that additional pole positions are produced in the area of the pass band flanks. The exact position of the pole positions or notches is achieved by varying the inside geometry of the coupling resonators. The inside geometry is varied to obtain either a smaller or a greater distance from one of the holes forming the filter. When coupling holes for the RX filter are on the short-circuit end, they are usually a shorter distance away from the unmetallized end face but a greater distance away from the resonators on the short-circuit end, but these relationships are usually reversed in the TX filter. This is achieved with an offset and varying cross section of the coupling hole over the length of the hole.

In addition to the terminal faces which create the coupling capacitances, additional metallic structures for decoupling of the two filters (transmission filter and receiving filter) may also be provided in a duplexer, which is designed in a single base body in this embodiment. Like the aforementioned coupling structures, these metallic decoupling structures may be designed as metallized recesses in the end face. They may be electrically isolated or connected to the metallized holes (resonator holes) of one of the two filters. The decoupling structures serve to influence the input impedance of a filter and thus alter the phase angle in a suitable manner and thus achieve decoupling of the two paths. This makes it possible to prevent the signals of the receiving path and the transmitting path from influencing one another mutually in the two transmission ranges. The decoupling structures may be mounted on filters.

Whereas the resonator hole of an inventive filter usually runs over the entire height of the base body, the recess for the inventive metallic structures extends only to a depth amounting to approximately 2 to 20% of the total height of the base body. A duplexer for frequencies in the GHz range used for mobile wireless can therefore have metallized recesses in the end face having a depth of 0.1 to 1 mm. The depth of the recesses in the end face, which represents the spatial dimension of the coupling capacitance, can be utilized easily in inventive filters for adjusting the size of the coupling capacitance. A higher capacitance can be set with a greater depth of the recesses. If the area required, based on the end face, remains otherwise the same, a metallization (metallic structure) arranged in recesses according to this invention will have a higher capacitance accordingly and/or will develop a greater capacitance with respect to the resonator holes.

For decoupling and for better separation of RX and TX filters, a delay line may be provided on the antenna input and/or output. Since the antenna is capacitively connected to both the input of the RX filter and the output of the TX filter, this ensures that the RX filter and TX filter will have little influence on one another in the transmission ranges, and signals input from the TX path into the RX filter in the blocking-state region will be dampened to an even greater extent than is the case with an individual filter. Such a delay line may be, for example, an electric connection between the antenna terminal and the exterior metallization which has a suitable electric length corresponding to the desired phase rotation.

For example, it is possible to provide such a delay line in the form of a decoupling hole in the ceramic body between the two innermost adjacent resonators of the RX filter and the TX filter. This coupling hole is connected on one side to the exterior metallization and on the other side to the terminal face for the antenna input and output. The connection of the decoupling hole to the exterior metallization may be formed on the short-circuit end. However, it is also possible to provide a capacitive terminal face in the area of the short-circuit end and to electrically connect the other end of the decoupling hole on the end face, which is largely free of metallization, to the exterior metallization.

In another embodiment, a duplexer may have a beveled edge at least on the edges of the end face toward the bottom side or it may drop off toward the bottom side in the form of an additional step. The capacitive terminal faces are then preferably designed to extend over this beveled edge or step. This ensures that the terminal faces have a better hold on the ceramic body and consequently the solder connections created on the terminal faces will also adhere tightly to the ceramic body.

The duplexer is explained in greater detail below on the basis of exemplary embodiments and the respective figures. The figures show schematically various views of various embodiments of duplexers. For a better understanding, they are not drawn true to scale. The same elements in different figures are labeled with the same reference numbers.

DESCRIPTION OF THE DRAWINGS

FIG. 7 shows a duplexer having a beveled edge.

FIG. 8 shows a duplexer having a step.

DETAILED DESCRIPTION

Figure 1:
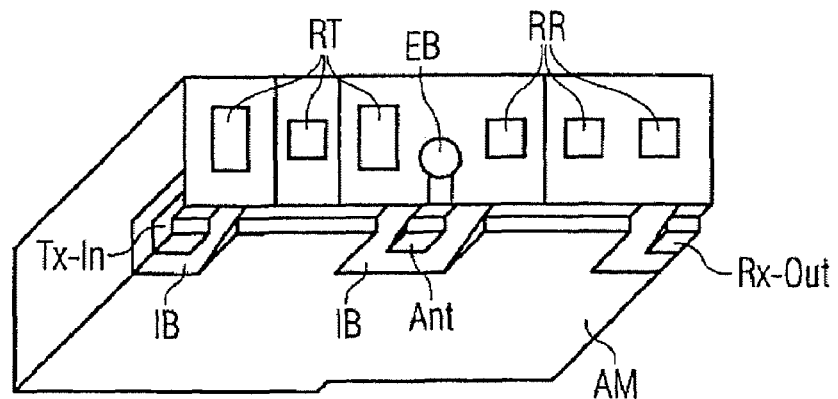
FIG. 1 shows an essentially known duplexer in a spatial diagram shown obliquely from the front and below.

FIG. 1 shows an essentially known monolithic duplexer which is implemented in the form of microwave resonators in a shared ceramic body. The ceramic body has internally metallized holes passing through the entire body. In the embodiment depicted here, three holes RT form a TX filter and three holes RR form an RX filter. The holes open on the non-metallized end face of the ceramic body. Metallic terminal faces formed on the bottom side of the ceramic body may be capacitively coupled to the resonators RT, RR implemented through the metallized holes without being electrically connected to them. A total of only three capacitively coupled electric terminal faces are provided for the duplexer, one for the TX_IN input of the TX branch, one terminal face RX-out for the output of the RX branch and one terminal face ANT for the antenna which at the same time corresponds to the input of the RX branch and the output of the TX branch. An exterior metallization AM is applied to all surfaces of the ceramic body except the end face through isolated areas IB of the terminal faces, isolated from the terminal faces. The exterior metallization is electrically connected to the metallized holes on the short-circuit end. An additional step is formed on the edge of the end face to the bottom side. The metallization of all three terminal faces is continued over this step. The metallization for the terminal faces TX-1N and RX-OUT is also passed around a lateral edge onto the respective side faces. This also improves the adhesion of the terminal faces and additionally allows the duplexer to be soldered and connected electrically from the side either alternatively or additionally. Since the pass band of the RX filter is at a higher frequency than the pass band of the TX filter, the ceramic body is generally designed to be shorter in the area of the RX filter but can also be brought to the same length through appropriate design of the holes. However, the width and height of the individual filters in the duplexer are uniform.

Figure 2:
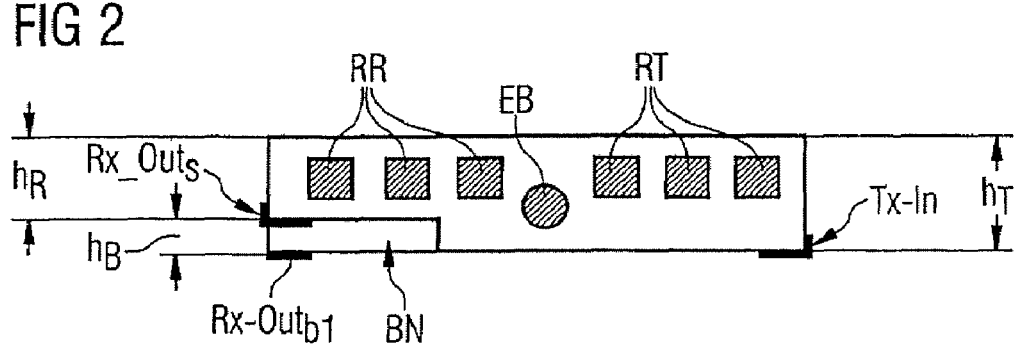
FIG. 2 shows a duplexer from the front.

FIG. 2 shows a duplexer in a view of the end face as seen from above. Here again, there is a shared ceramic body in which internally metallized holes RT for the resonators of the TX filter and holes RR for the resonators of the RX filter are implemented. In the area of the RX filter arranged at the left of the diagram, the height hR is reduced with respect to the height hT. This area forms a recess in which a balun BN is situated. This is implemented in an LTCC ceramic and has a overall height hB which advantageously corresponds to the depth of the recess. Therefore it holds that hT=hR+hB. The area of the recess is preferably designed so that it is suitable for completely holding the balun BN.

On its top dielectric layer, the balun has electric contacts which are arranged to coincide with the capacitive terminal face RX-OUT$_s$ of the ceramic body and/or of the RX filter. Another contact face on the top side of the balun BN establishes a contact with the exterior metallization AM of the duplexer which is usually connected to ground in the circuit environment. The balun BN has two electric outputs RX-OUT$_b$ on the bottom side, these outputs preferably being arranged at the same height as the input TX-IN of the TX filter. In another embodiment, the duplexer depicted in FIG. 2 also has a decoupling hole EB which is connected to the exterior metallization AM on one side but is connected to the terminal for the antenna ANT on the other side, as already mentioned above.

Figure 3:
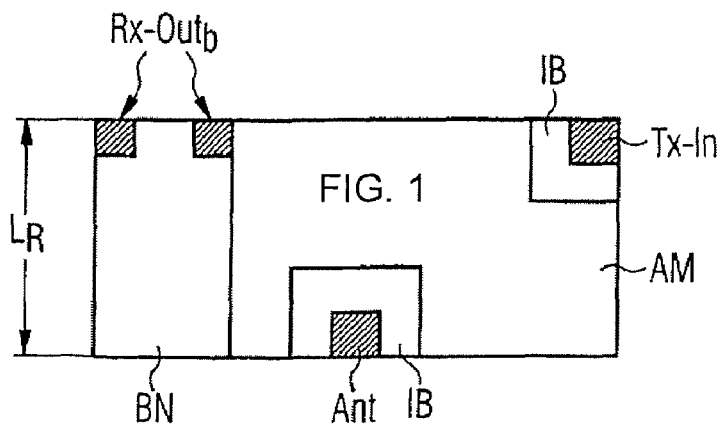
FIG. 3 shows a duplexer from underneath.

FIG. 3 shows a duplexer from the bottom side and especially the position of the electric terminal faces of the duplexer provided there. The balun BN extends over the total length LR of the RX filter and is completely fitted into the recess. In the embodiment depicted here, the outputs RX-OUTb of the balun, which at the same time form the RX outputs of the component, are arranged close to or directly adjacent to the edge with the end face. The input TX-IN of the TX filter is likewise provided in proximity to or directly adjacent to and preferably around the edge with the side face. In this embodiment, the antenna terminal ANT is arranged in proximity or directly adjacent to the edge to the rear side of the duplexer opposite the end face of the duplexer. On the other surface of the balun BN is the surface of the bottom dielectric layer (in a normal view). It may be partially metallized—but isolated from the outputs RX-OUTb—to achieve a better electric and/or mechanical connection to the circuit board to which the duplexer is usually soldered. On the other bottom side of the ceramic body not covered by the balun, the exterior metallization of the duplexer is arranged, electrically isolated from the capacitive terminal faces TX-IN and ANT via the isolating areas IB.

Figure 4:
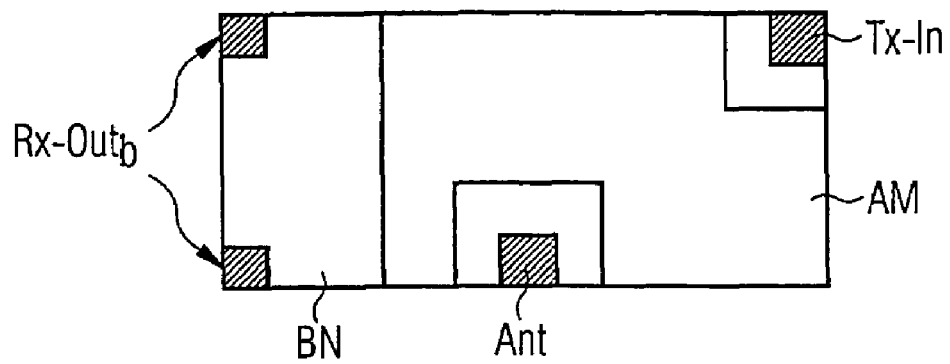
FIG. 4 shows another duplexer from underneath with altered terminal positions.

FIG. 4 shows a different arrangement of the outputs RX-OUT$_b$ of the balun BN by comparison. The two terminal faces are arranged directly adjacent or in proximity to the edge between the bottom side and the left side face. The terminal faces ANT for the antenna and TX-IN remain unchanged in comparison with the embodiment in FIG. 3.

Figure 6:
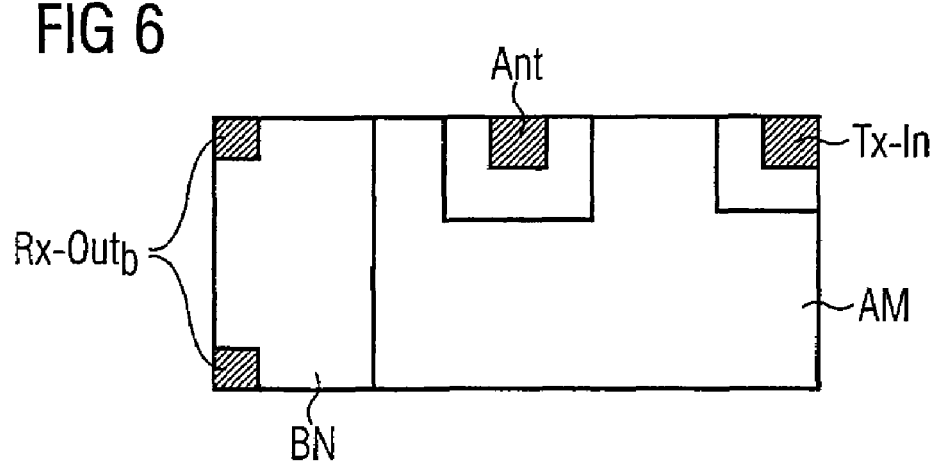
FIG. 6 shows a duplexer having a displaced antenna terminal as seen from underneath.

FIG. 6 shows another variation of the position of the terminal faces in which only the terminal face ANT for the antenna has been switched in comparison with FIG. 4 and is now arranged in the area of the edge between the end face and the bottom side.

Figure 5:
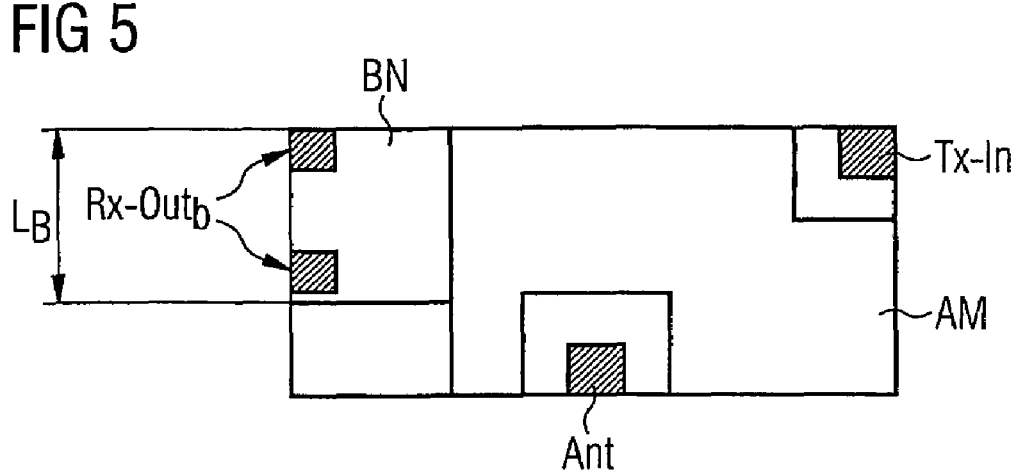
FIG. 5 shows a duplexer having a smaller balun as seen from underneath.

FIG. 5 shows another embodiment with a balun BN having a smaller base area. It has a length LB which is shorter than the length LR of the RX filter. The balun is arranged directly adjacent to the end face. This results in the height hR of the ceramic body being equal to the original height in the area of the short-circuit end of the RX filter and equal to the height hT of the ceramic body in the area of the TX filter: hT=hR. Such a duplexer having a smaller balun and/or with no change in height (hR=hT) of the ceramic body on the side of the RX filter and on the short-circuit end of the filter has improved electric values for the RN filter in comparison with the exemplary embodiments according to FIGS. 3, 4 and 6.

The terminals are RX-OUT and TX-IN may of course also be arranged in mirror image to the exemplary embodiments depicted in FIGS. 1 through 6 or in an entirely different arrangement. The same thing also applies to the position of the antenna terminal ANT.

FIG. 7 shows a detail of a duplexer with another design in the area of the edges between the end face SF and the bottom side. The originally rectangular edge there is replaced by a beveled edge F, where the ceramic body is beveled at the edge. The capacitive terminal faces for the filter preferably extend from the bottom side of the ceramic body to beyond the beveled edge F. FIG. 7 also shows another possible embodiment in which the connecting face AF also extends beyond parts of the side face SEF. Accordingly, the isolating area IB extends to the side face while also electrically isolating the connecting face AF from the exterior metallization AM there.

FIG. 8 shows another possible embodiment of the edge design of a duplexer. In the area of the edge between the side face SEF and the bottom side US, the ceramic body has a step S. All connecting faces AF, an exterior one of which is shown in the figure, are preferably extended beyond the bottom side as well as beyond both step faces. This results in improved adhesion of the connecting face, which is further intensified for the connecting face AF depicted here by being continued onto parts of the side face SF.

A duplexer with a balun integrated into the outside dimensions of the ceramic body has an insertion loss of the RX path which is elevated in comparison with a duplexer without a balun but is still equal to or less than that of a comparable embodiment, e.g., with an FBAR filter or a SAW filter. The insertion loss of the TX path remains low on the whole, which is advantageous. In some embodiments, the duplexer offers the possibility of arranging the symmetrical output RX-OUTs on the balun largely independently of the RX filter without this having any effects on the electric properties of the filter and thus the duplexer. The overall flat design of the duplexer, which is not elevated in comparison with that of a traditional duplexer without a balun, is also advantageous. This is a compact, one-piece and easily handled component. The balun at the output of the RX path permits a simple impedance adjustment of the asymmetrical output of the RX filter to the antenna. The outputs RX-OUTb of the balun may be adapted to a value deviating from 50 ohm. In addition, the adaptation of the RX-OUT of the duplexer and the RX-TN of the balun may be selected freely in a range that is favorable for both of the individual components and may be, for example, not equal to 50 Ω. The balun at the output of the RX path also maintains the good power compatibility of the duplexer of more than 33 dBm.

Furthermore, it is possible to integrate additional functions and components into the LTCC ceramics of the balun. For example, it is possible to integrate additional LC elements for designing additional pole positions or notches. This facilitates suppression of certain frequencies without any significant increase in insertion loss or increase in the external dimensions of the duplexer.

The invention claimed is:

1. A duplexer comprising:
   an input filter (Rx filter),
   an output filter (Tx filter), and
   wherein the Rx and Tx filters comprise microwave (MW) resonators comprising a ceramic body having continuous, internally metallized holes,
   wherein the ceramic body includes a metal coating substantially covering external surfaces of the ceramic body except for an end face and one or more recesses on a bottom side of the ceramic body,
   wherein an output of the Rx filter on the bottom side of the ceramic body is electrically connected to a balun, the balun being implemented in a low-temperature co-fired ceramic (LTCC) on a bottom side of the Rx filter, and
   wherein the ceramic body has a first height in an area of the Tx filter and a second height in an area of the Rx filter, the second height being less than the first height.

2. The duplexer of claim 1, wherein the ceramic body has a recess on the bottom side of the Rx filter and the balun is in the recess.

3. The duplexer of claim 2, wherein a height of the recess and a height of the balun are about equal.

4. The duplexer of claim 3, wherein a sum of a height of duplexer and the height of the balun in a first region is approximately equal to a height of the duplexer in a second region.

5. The duplexer of claim 3, wherein the duplexer and the balun has an about uniform overall height.

6. The duplexer of claim 2, wherein the recess on the bottom side of the Rx filter comprises a non-metallized portion on a first end of the ceramic body, and the Rx filter has a height corresponding to a height of the Tx filter on a second end, the second end being about opposite the first end and having a different height than the first end.

7. The duplexer of claim 1, further comprising internal metallization in a hole between the Rx filter and the Tx filter to form an internally metallized hole, the internally metallized hole being electrically connected at a first end to the metal coating and at a second end to an antenna terminal.

8. The duplexer of claim 1, wherein:
   the Tx filter comprises:
      first ones of the continuous, internally metallized holes; and
   the Rx filter comprises:
      second ones of the continuous, internally metallized holes, and
   wherein the ceramic body comprises at least one decoupling resonator between the Tx filter and the Rx filter.

9. The duplexer of claim 1, wherein the balun is soldered to the ceramic body and is electrically connected to at least one terminal of the duplexer.

10. The duplexer of claim 1, wherein the balun is attached to the ceramic body by an electrically conductive adhesive, the electrically conductive adhesive forming an electrical connection between the balun and at least one terminal of the duplexer.

11. The duplexer of claim 1, wherein a height of the balun is between about 0.3 and about 0.4 mm, the height of the balun being about equal to a height difference between the Rx filter and the Tx filter.

12. The duplexer of claim 1, wherein an edge between the end face and the bottom side of the ceramic body comprises a step and wherein one or more terminal faces of the duplexer extend over the step.

13. The duplexer of claim 1, wherein an edge between the end face and the bottom side of the ceramic body comprises a beveled edge and wherein one or more terminal faces of the duplexer extend over the beveled edge.

14. The duplexer of claim 1, wherein the ceramic body comprises a shared ceramic body.

* * * * *